US012461691B2

(12) United States Patent
Redaelli et al.

(10) Patent No.: US 12,461,691 B2
(45) Date of Patent: Nov. 4, 2025

(54) MEMORY DEVICE BACKGROUND OPERATIONS

(71) Applicant: Micron Technology, Inc., Boise, ID (US)

(72) Inventors: Marco Redaelli, Munich (DE); Gianluca Coppola, Saviano (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/603,746

(22) Filed: Mar. 13, 2024

(65) Prior Publication Data

US 2024/0393978 A1    Nov. 28, 2024

Related U.S. Application Data

(60) Provisional application No. 63/504,597, filed on May 26, 2023.

(51) Int. Cl.
*G06F 3/06* (2006.01)

(52) U.S. Cl.
CPC ............ *G06F 3/0659* (2013.01); *G06F 3/061* (2013.01); *G06F 3/0616* (2013.01); *G06F 3/0679* (2013.01)

(58) Field of Classification Search
CPC ...... G06F 3/061; G06F 3/0616; G06F 3/0659; G06F 3/0679
See application file for complete search history.

(56) References Cited

U.S. PATENT DOCUMENTS

| 2007/0033378 A1* | 2/2007 | Sinclair | G06F 3/0652 |
| | | | 711/E12.008 |
| 2008/0279005 A1* | 11/2008 | France | G11C 16/3418 |
| | | | 365/185.11 |

* cited by examiner

*Primary Examiner* — Larry T Mackall
(74) *Attorney, Agent, or Firm* — Harrity & Harrity, LLP

(57) ABSTRACT

Implementations described herein relate to memory device background operations. In some implementations, a memory device may receive a background operation command, from a host device, that indicates for the memory device to initiate a background operation for a memory of the memory device. The background operation command may include at least one of an optimization indicator, an idle time indicator, or a power-off time indicator. The memory device may initiate the background operation in accordance with the background operation command.

20 Claims, 4 Drawing Sheets

MEMORY DEVICE BACKGROUND OPERATIONS

CROSS-REFERENCE TO RELATED APPLICATION

This patent application claims priority to U.S. Provisional Patent Application No. 63/504,597, filed on May 26, 2023, entitled "MEMORY DEVICE BACKGROUND OPERATIONS," and assigned to the assignee hereof. The disclosure of the prior application is considered part of and is incorporated by reference into this patent application.

TECHNICAL FIELD

The present disclosure generally relates to memory devices, memory device operations, and, for example, to memory device background operations.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
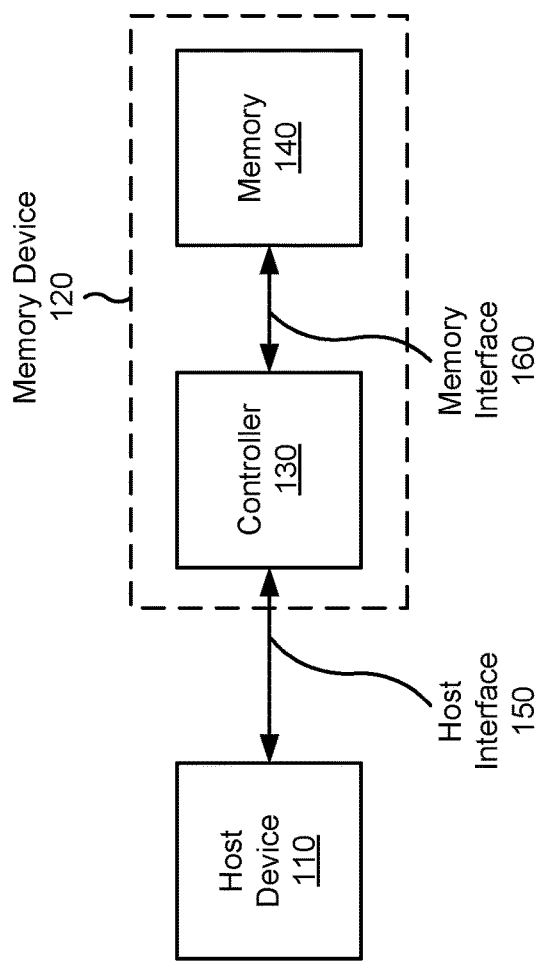
FIG. 1 is a diagram illustrating an example system capable of memory device background operations.

A memory device, such as a managed non-volatile memory (mNVM) device, may be configured to perform memory operations such as foreground memory operations and background memory operations. The mNVM device may be a solid-state drive (SSD), a multi-media card (MMC), an embedded multi-media card (eMMC), a universal flash storage (UFS) device, or a solid-state storage (SSS) device, among other examples. A foreground operation is a memory operation that is given higher priority and that is executed before other memory operations such as background operations. In one example, the foreground operation may be a read or write operation associated with a system, such as an automobile, that includes the memory device. In contrast, a background operation is a memory operation that is less critical than other operations such as foreground operations. A background operation may be any type of housekeeping operation performed on a memory of the memory device. Some examples of background operations include wear leveling, read wear leveling, garbage collection, and auto-initiated refresh, among other examples. Background operations may be performed during a memory device idle time, such as when the system that includes the memory device is in an idle state and/or when there are no host commands being received by the memory device. A background operation may be promoted to the foreground when the background operation becomes urgent, such as to prevent memory device corruption or failure. However, this may result in a temporary drop in performance by the memory device. In some cases, this drop in performance may be reduced by scheduling the background operations during the memory device idle time. However, a host device that is interacting with the memory device using read and write commands may not be configured with memory device background operation information and/or memory device idle time information. This may result in the memory device performing background operations at a time when the host device is attempting to perform read and write operations, which may disrupt the user experience.

Some implementations described herein enable memory device background operations. In particular, some implementations described herein enable background operations for a managed non-volatile memory device and that are controlled by a host device. In some implementations, a memory device may receive, from a host device, a command that indicates for the memory device to initiate a background operation for a memory of the memory device. The command may include an optimization indicator, an idle time indicator, and/or a power-off time indicator. The optimization indicator may indicate whether the background operation is to be performed in accordance with a performance characteristic, a reliability characteristic, or a balanced characteristic. The idle time indicator may indicate a time period during which the system is idle and the memory device is to perform the background operation. The power-off time indicator may indicate a time period during which a system that includes the memory device and the host device is to be powered off. In some implementations, the host device may read one or more bits, from the memory of the memory device, that indicate an urgency for the background operation. The host device may send the command to the memory device, for the memory device to initiate the background operation, in accordance with the urgency for the background operation. The implementations described herein may enable the host device to control background operations on behalf of the memory device. For example, the host device may be configured with memory device background operation information and/or memory device idle time information, and may schedule the background operations during a memory device idle time. This may reduce a likelihood of memory device corruption or failure, and may prevent disruptions to the user experience. Additional details are described herein.

FIG. 1 is a diagram illustrating an example system 100 capable of memory device background operations. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to receive a background operation command, from a host device, that indicates for the memory device to initiate a background operation for a memory of the memory device, wherein the background operation command includes at least one of an optimization indicator, an idle time indicator, or a power-off time indicator; and initiate the background operation in accordance with the background operation command.

In some implementations, one or more systems, devices, apparatuses, components, and/or controllers of FIG. 1 may be configured to send a background operation command, to a memory device, that indicates for the memory device to initiate a background operation for a memory of the memory device, wherein the background operation command includes at least one of an optimization indicator, an idle time indicator, or a power-off time indicator. One or more other systems, devices, apparatuses, components, and/or controllers of FIG. 1 may be configured to receive the background operation command from the host device; and initiate the background operation in accordance with the background operation command.

In some implementations, one or more systems, devices, apparatuses, components, and/or controllers of FIG. 1 may be configured to receive a background operation command, from a host device, that indicates for the memory device to initiate a background operation; and initiate the background operation in accordance with the background operation command.

As indicated above, FIG. 1 is provided as an example. Other examples may differ from what is described with regard to FIG. 1.

Figure 2:
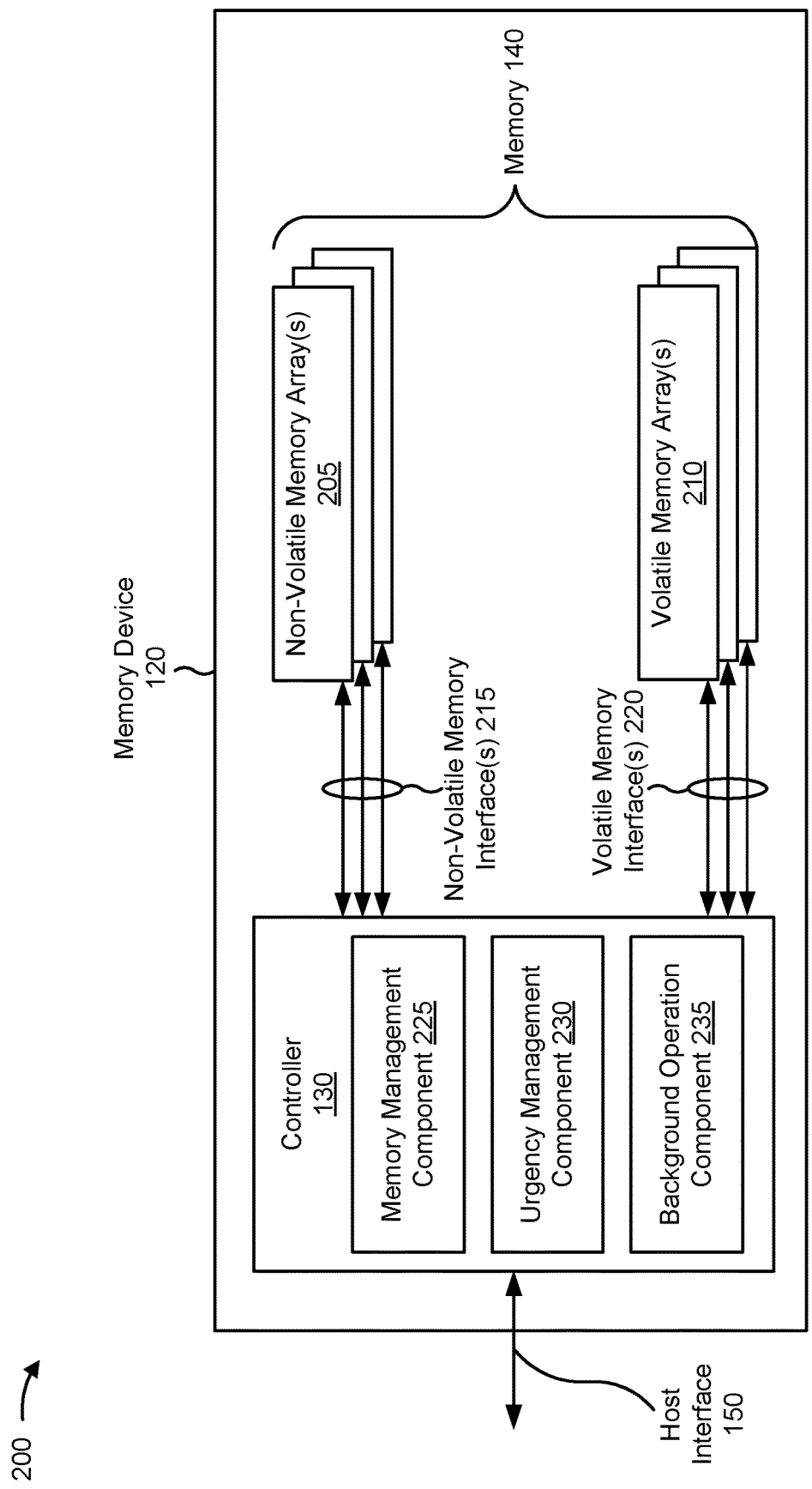
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an urgency management component 230, and/or a background operation component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The urgency management component 230 may be configured to maintain one or more bits that indicate an urgency of background operations. For example, the urgency management component 230 may maintain a register that is readable by the host device 110 and that indicates an index of urgency for the memory device background operations. This may enable the host device 110 to identify when background operations need to be performed by the memory device 120, such as during an idle time of the memory device 120. The one or more bits may indicate any number of urgency levels. In one example, the urgency may be represented by a single bit, where 0 indicates that the background operations are not urgent and 1 indicates that the background operations are urgent. In another example, the urgency may be represented by two bits, where 00 indicates no urgency, 01 indicates a low urgency, 10 indicates a medium urgency, and 11 indicates a high urgency. In another example, the urgency may be represented by multiple bits with values ranging zero to one hundred (with increasing urgency).

The background operation component 235 may be configured to initiate and perform background operations for the memory device 120. The background operation component 235 may initiate the background operations based on receiving a command from the host device 110 that indicates for the memory device 120 to perform the background operations. The background operations may include any housekeeping operation that is performed on the memory of the memory device. In some examples, the background operations may include wear leveling, read wear leveling, garbage collection, and auto-initiated refresh, among other examples. Additional details regarding the background operations are described in connection with FIG. 3.

One or more devices or components shown in FIG. 2 may be configured to perform operations described herein, such as one or more operations and/or methods described in connection with FIG. 3. For example, the controller 130, the memory management component 225, the urgency management component 230, and/or the background operation component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
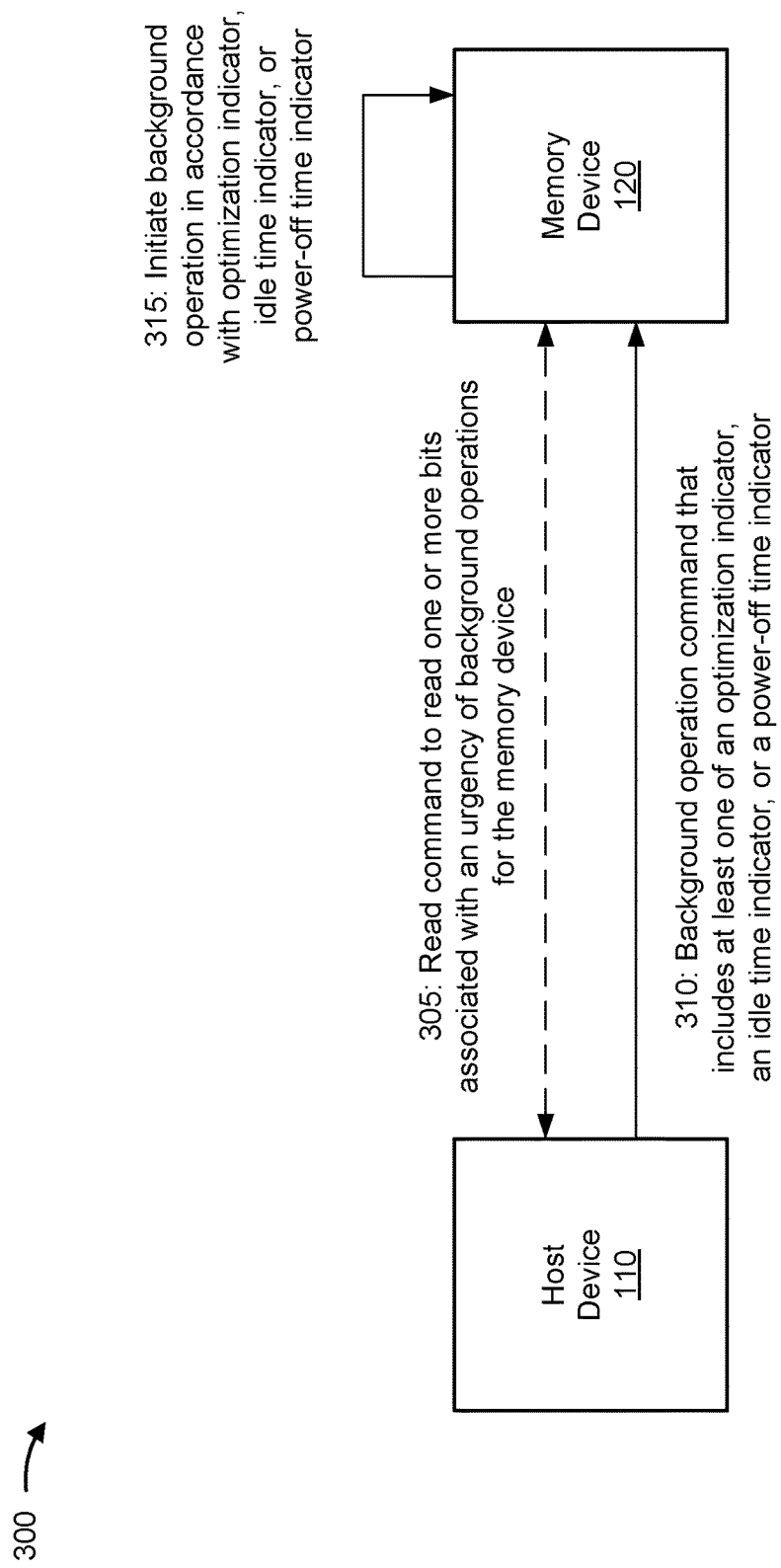
FIG. 3 is a diagram illustrating an example of memory device background operations.

FIG. 3 is a diagram illustrating an example 300 of memory device background operations. The background operations may include any type of background or housekeeping operations that are capable of being performed on the memory of the memory device 120. In some examples, the background operations may include wear leveling, read wear leveling, garbage collection, and/or auto-initiated refresh. Wear leveling may be used by the memory device 120 to prevent certain blocks of memory from wearing out faster than other blocks of memory. In some types of memory devices, such as flash memory devices, repeatedly writing to the same location in the memory, or repeatedly reading from the same location in the memory, may cause that location in the memory to wear out more quickly than other locations, which may result in a shorter lifespan for the memory device 120. To perform wear leveling, the memory device 120 may distribute write operations across all available blocks of memory, rather than repeatedly writing to the same memory block. Similarly, to perform read wear leveling, the memory device 120 may distribute read operations across all blocks of memory, rather than repeatedly reading from the same memory block. This may require the memory device 120 to track which memory blocks are read from, and how often those memory blocks are read from, and to distribute the data accordingly. Wear leveling and read wear leveling may increase the likelihood that all blocks of memory wear out at an even rate, which may extend the lifespan of the memory device 120. Garbage collection may be used by the memory device 120 to manage storage space and maintain performance of the memory device 120 over time. Data may be stored in a memory block of the memory device, and when that data is no longer needed, the memory block may need be erased before another write operation can be performed for the memory block. The memory device 120, to perform a garbage collection operation, may identify and consolidate old or unused data in the drive to free up memory blocks for future use. The memory device 120 may track which memory blocks are no longer in use and may group those memory blocks together and erase them as a whole. This may reduce the number of erase cycles that are required by the memory device 120, which may improve the performance and the lifespan of the memory device 120. Auto-initiated refresh may be used by the memory device 120 to periodically refresh the memory cells of the memory device. If the memory cells of the memory device are not refreshed periodically, the charge stored in the memory cells may fade, causing the data stored within the cells to become lost or corrupted. To perform an auto-initiated refresh, the memory device 120 may automatically (e.g., without host intervention) refresh the memory cells of the memory device at periodic intervals. In some cases, a DRAM controller within the memory device 120 may perform the auto-initiated refresh by periodically accessing each memory cell and re-writing the data within the memory cell.

As shown by reference number 305, the host device 110 may read one or more bits that indicate an urgency of the background operations to be performed by the memory device 120. The one or more bits that indicate the urgency of the background operations to be performed by the memory device 120 may be stored in a register of the memory device 120 and may be maintained, for example, by the urgency management component 230 of the memory device 120. In one example, at a first time, the memory device 120 may determine that the need for the background operations to be performed is low. In this case, the memory device 120 and/or the urgency management component 230 may set a single bit to zero to indicate that the urgency is low, or may set a plurality of bits to indicate a value of one (ranging from zero to ten with increasing urgency). At a second time, the memory device 120 may determine that the need for the background operations to be performed is high. In this case, the memory device 120 and/or the urgency management component 230 may set the single bit to one to indicate that the urgency is high, or may set the plurality to bits to indicate a value of eight.

The host device 110 may read the one or more bits from the memory of the memory device 120. For example, the host device 110 may send a read command to the memory device 120 to read the one or more bits that indicate the urgency of the background operations. The memory device 120 may receive the read command from the host device 110, and may transfer data to the host device 110 that indicates the urgency of the background operations. The host device 110 may send a background operation command to the memory device 120 in accordance with the one or more bits. For example, the host device 110 may refrain from sending the background operation command, or may wait a longer time period before sending the background operation command, in accordance with the urgency being low. Alternatively, the host device 110 may send the background operation command (e.g., immediately) in accordance with the urgency being high.

In some implementations, the memory device 120 may initiate the background operations, without input from the host device 110, in accordance with the one or more bits that indicate the urgency of the background operations. For example, firmware of the memory device 120 may initiate the background operations in accordance with the one or more bits indicating that the urgency level for the background operations is greater than an urgency level threshold. In one example, the urgency level threshold may be nine, and the firmware of the memory device 120 may initiate the background operations, without input from the host device 110, in accordance with the one or more bits having a value that is nine or higher. The firmware may initiate the background operations to prevent the memory device 120 from being corrupted or failing, even at the expense of reduced read and write performance by the memory device 120.

As shown by reference number 310, the host device 110 may send a command, such as a background operation command, to the memory device 120, that indicates for the memory device 120 to perform a background operation. The background operation command may include an optimization indicator, an idle time indicator, and/or a power-off time indicator, among other examples.

The optimization indicator may indicate whether the background operations are to be performed in accordance with a performance characteristic, a reliability characteristic, or a balanced characteristic. A background operation performed in accordance with the performance characteristic may use more memory resources and may be performed at a faster rate. However, this may result in more frequent memory device failure occurrences and/or faster memory device aging. A background operation performed in accordance with the reliability characteristic may use fewer memory resources and may be performed at a slower rate. This may result in less frequent memory device failure occurrences and/or slower memory device aging. A background operation performed in accordance with the balanced characteristic may use more memory resources and may be performed at a slower rate than a background operation performed in accordance with the performance characteristic, but may use fewer memory resources and may be performed at a faster rate than a background operation performed in accordance with the reliability characteristic. In some implementations, the background operations may be performed by default in accordance with the balanced characteristic. Thus, the memory device 120 may perform a background operation using the balanced characteristic in accordance with the background operation comment not including the optimization indicator.

The idle time indicator may indicate a time period during which the memory device 120 is to perform the background operations. The host device 110 may be configured not to instruct the memory device 120 to perform read or write operations during the idle time period. In some implementations, a default idle time period may be five seconds. Thus, the memory device 120, upon becoming idle, may remain in the idle state for a minimum of five seconds for performing background operations.

The power-off time indicator may indicate a power-off time for a system that includes the host device 110 and the memory device 120. The host device 110 may determine that the system will be powered-off for a time period, and may instruct the memory device 120 to perform the background operations in accordance with the system power-off time. In the automobile example, the host device 110 may determine that the automobile will be shut-off for an extended time period, such as while parked at an airport or during an extended holiday, and may instruct the memory device 120 to perform an auto-initiated refresh before the automobile is powered off.

In some implementations, the background operation command may include only one of the optimization indicator, the idle time indicator, or the power-off time indicator. In some other implementations, the background operation command may include two or more of the optimization indicator, the idle time indicator, and the power-off time indicator. For example, the background operation command may include the optimization indicator and the idle time indicator, or may include all three of the optimization indicator, the idle time indicator, and the power-off time indicator. Additionally, or alternatively, the background operation command may include other indicators.

As shown by reference number 315, the memory device 120 may initiate and/or perform the background operation in accordance with the background operation command. For example, the memory device 120 may initiate and/or perform the background operation in accordance with the optimization indicator, the idle time indicator, and/or the power-off time indicator. This may enable the host device 110 to control the background operations performed by the memory device 120.

As described herein, memory device firmware may not be able to determine the background operation requirements for a system that includes the memory device 120 and the host device 110. This may result in the background operations being scheduled during system-critical operations. In the example where the system is an automobile (or is included in an automobile), the background operation should not be scheduled during a system boot (e.g., for three to ten minutes after the system boot), during critical system updates (e.g., for application or media downloads), while automobile cameras (e.g., rear cameras, front cameras, or side cameras) are activated and the automobile is being maneuvered, during a block box data saving operation (e.g., after an occurrence of an automobile accident), or during a file system trim (FSTRIM) operation. However, the memory device firmware may not be configured with information that indicates when these system-critical operations are scheduled to be performed. Scheduling the background operations to occur during the system-critical operations may disrupt the user experience and/or may cause the system to fail. By enabling the host device 110 to control the background operations, the background operations may be scheduled during memory device idle time. For example, the background operations may be scheduled when the driver of the automobile exits the automobile (e.g., before shutting down the electronics), during a 12V battery removal procedure, during over-the-air communications, or during a system light load condition (such as while playing music or a during screen-off time). In some implementations, the background operations may be performed in accordance with an optimization indicator, which enables the host device 110 to consider specific application conditions when scheduling the background operations, in accordance with a system idle time, which enables the host device 110 to adapt the background operations to the system idle time, and in accordance with an estimated power-off time, which enables the host device 110 to perform the background operations (such as auto-initiated refresh) in accordance with an extended power-off time of the system, such as when the automobile is parked at an airport or during an extended holiday. This may result in fewer disruptions to the user experience and may reduce a likelihood of memory device and system failure.

As indicated above, FIG. 3 is provided as an example. Other examples may differ from what is described with regard to FIG. 3.

Figure 4:
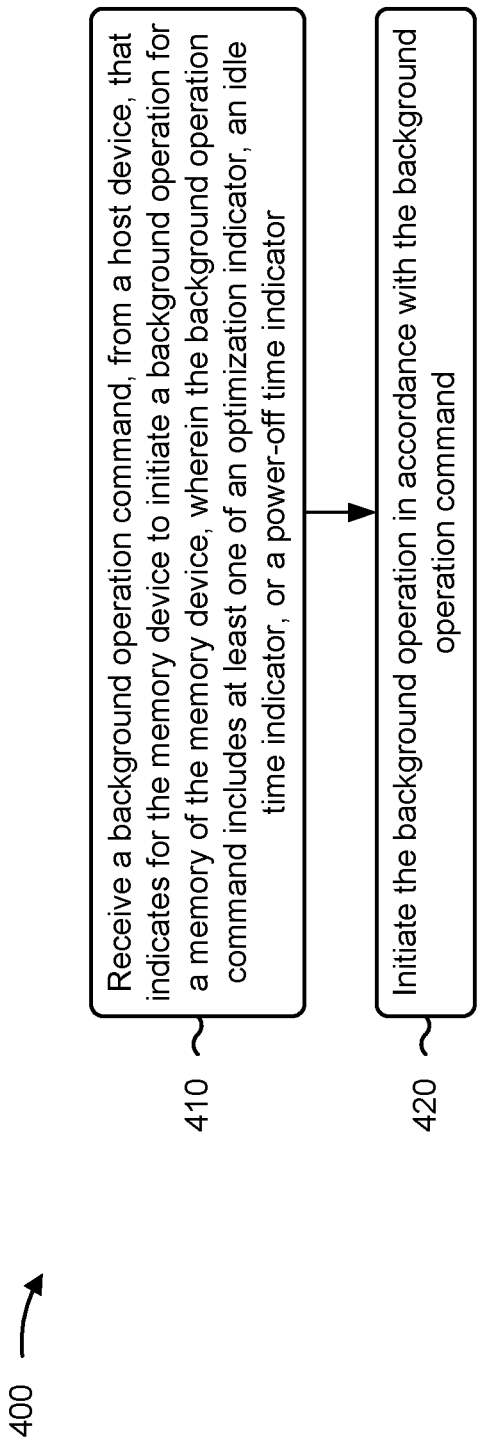
FIG. 4 is a flowchart of an example method associated with memory device background operations.

FIG. 4 is a flowchart of an example method 400 associated with memory device background operations. In some implementations, a memory device (e.g., the memory device 120) may perform or may be configured to perform the method 400. In some implementations, another device or a group of devices separate from or including the memory device (e.g., the system 100) may perform or may be configured to perform the method 400. Additionally, or alternatively, one or more components of the memory device (e.g., the controller 130, the memory management component 225, the urgency management component 230, and/or the background operation component 235) may perform or may be configured to perform the method 400. Thus, means for performing the method 400 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 400.

As shown in FIG. 4, the method 400 may include receiving a background operation command, from a host device, that indicates for the memory device to initiate a background operation for a memory of the memory device, wherein the background operation command includes at least one of an optimization indicator, an idle time indicator, or a power-off time indicator (block 410). As further shown in FIG. 4, the method 400 may include initiating the background operation in accordance with the background operation command (block 420).

The method 400 may include additional aspects, such as any single aspect or any combination of aspects described below and/or described in connection with one or more other methods or operations described elsewhere herein.

In a first aspect, the method 400 may further include receiving a read command, from the host device, to read one or more bits, from the memory of the memory device, associated with an urgency of the background operation, wherein the one or more components, to initiate the background operation in accordance with the background operation command, are configured to initiate the background operation in accordance with the background operation command and the one or more bits.

In a second aspect, alone or in combination with the first aspect, initiating the background operation may include initiating the background operation in accordance with one or more bits, associated with an urgency of the background operation, indicating that an urgency level for the background operation satisfies an urgency level threshold.

In a third aspect, alone or in combination with one or more of the first and second aspects, the optimization indicator indicates whether the background operation is to be performed in accordance with a performance characteristic, a reliability characteristic, or a balanced characteristic.

In a fourth aspect, alone or in combination with one or more of the first through third aspects, the idle time indicator indicates an idle time for the memory device during which the memory device is to perform the background operation.

In a fifth aspect, alone or in combination with one or more of the first through fourth aspects, initiating the background operation may include initiating the background operation in accordance with a default optimization characteristic based on the background operation command not including the optimization indicator, or in accordance with a default idle time period based on the background operation command not including the idle time indicator.

In a sixth aspect, alone or in combination with one or more of the first through fifth aspects, the power-off time indicator indicates a time period during which a system that includes the memory device and the host device is to be in a powered off state.

In a seventh aspect, alone or in combination with one or more of the first through sixth aspects, the background operation command includes each of the optimization indicator, the idle time indicator, and the power-off time indicator.

In an eighth aspect, alone or in combination with one or more of the first through seventh aspects, the background operation is a wear leveling operation, a garbage collection operation, an auto-initiated refresh operation, or a read wear leveling operation.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

In some implementations, a memory device includes one or more components configured to: receive a background operation command, from a host device, that indicates for the memory device to initiate a background operation for a memory of the memory device, wherein the background operation command includes at least one of an optimization indicator, an idle time indicator, or a power-off time indicator; and initiate the background operation in accordance with the background operation command.

In some implementations, a system includes a host device configured to: send a background operation command, to a memory device, that indicates for the memory device to initiate a background operation for a memory of the memory device, wherein the background operation command includes at least one of an optimization indicator, an idle time indicator, or a power-off time indicator; and the memory device, wherein the memory device is configured to: receive the background operation command from the host device; and initiate the background operation in accordance with the background operation command.

In some implementations, an apparatus includes means for receiving a background operation command, from a host device, that indicates for the apparatus to initiate a background operation; and means for initiating the background operation in accordance with the background operation command.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components, implemented at least partially in hardware, configured to:
receive a background operation command, from a host device, that indicates for the memory device to initiate a background operation for a memory of the memory device,
wherein the background operation command includes an optimization indicator, an idle time indicator, and a power-off time indicator; and initiate the background operation in accordance with the background operation command.

2. The memory device of claim 1, wherein the one or more components are further configured to receive a read command, from the host device, to read one or more bits, from the memory of the memory device, associated with an urgency of the background operation, wherein the one or more components, to initiate the background operation in accordance with the background operation command, are configured to initiate the background operation in accordance with the background operation command and the one or more bits.

3. The memory device of claim 1, wherein the one or more components, to initiate the background operation, are configured to initiate the background operation in accordance with one or more bits, associated with an urgency of the background operation, indicating that an urgency level for the background operation satisfies an urgency level threshold.

4. The memory device of claim 1, wherein the optimization indicator indicates whether the background operation is to be performed in accordance with a performance characteristic, a reliability characteristic, or a balanced characteristic.

5. The memory device of claim 1, wherein the idle time indicator indicates an idle time for the memory device during which the memory device is to perform the background operation.

6. The memory device of claim 1, wherein the one or more components, to initiate the background operation, are configured to initiate the background operation in accordance with a default optimization characteristic based on the background operation command not including the optimization indicator, or in accordance with a default idle time period based on the background operation command not including the idle time indicator.

7. The memory device of claim 1, wherein the power-off time indicator indicates a time period during which a system that includes the memory device and the host device is to be in a powered off state.

8. The memory device of claim 1, wherein the background operation is a wear leveling operation, a garbage collection operation, an auto-initiated refresh operation, or a read wear leveling operation.

9. A system, comprising:
a host device configured to:
send a background operation command, to a memory device, that indicates for the memory device to initiate a background operation for a memory of the memory device,
wherein the background operation command includes an optimization indicator, an idle time indicator, and a power-off time indicator; and
the memory device, wherein the memory device is configured to:
receive the background operation command from the host device; and
initiate the background operation in accordance with the background operation command.

10. The system of claim 9, wherein the host device is further configured to send a read command, to the memory device, to read one or more bits, from the memory of the memory device, associated with an urgency of the background operation, and wherein the memory device, to initiate the background operation in accordance with the background operation command, is configured to initiate the background operation in accordance with the background operation command and the one or more bits.

11. The system of claim 9, wherein the memory device, to initiate the background operation, is configured to initiate the background operation in accordance with one or more bits, associated with an urgency of the background operation, indicating that an urgency level for the background operation satisfies an urgency level threshold.

12. The system of claim 9, wherein the optimization indicator indicates whether the background operation is to be performed in accordance with a performance characteristic, a reliability characteristic, or a balanced characteristic.

13. The system of claim 9, wherein the idle time indicator indicates an idle time for the memory device during which the memory device is to perform the background operation.

14. The system of claim 9, wherein the memory device, to initiate the background operation, is configured to initiate the background operation in accordance with a default optimization characteristic based on the background operation command not including the optimization indicator, or in accordance with a default idle time period based on the background operation command not including the idle time indicator.

15. The system of claim 9, wherein the power-off time indicator indicates a time period during which a system that includes the memory device and the host device is to be in a powered off state.

16. The system of claim 9, wherein the background operation is a wear leveling operation, a garbage collection operation, an auto-initiated refresh operation, or a read wear leveling operation.

17. An apparatus, comprising:
means for receiving, from a host device and via one or more components implemented at least partially in hardware, a background operation command that indicates for the apparatus to initiate a background operation,
wherein the background operation command includes an optimization indicator, an idle time indicator, and a power-off time indicator; and
means for initiating, via the one or more components, the background operation in accordance with the background operation command.

18. The apparatus of claim 17, further comprising means for receiving, from the host device and via the one or more components a read command to read one or more bits associated with an urgency of the background operation, wherein the means for initiating the background operation in accordance with the background operation command includes means for initiating the background operation in accordance with the background operation command and the one or more bits.

19. The apparatus of claim 17, wherein the power-off time indicator indicates a time period during which a system that includes the apparatus and the host device is to be in a powered off state.

20. The apparatus of claim 17, wherein the background operation is a wear leveling operation, a garbage collection operation, an auto-initiated refresh operation, or a read wear leveling operation.

* * * * *